United States Patent
Lebovitz et al.

[19]

[11] Patent Number: 6,124,861
[45] Date of Patent: Sep. 26, 2000

[54] METHOD AND APPARATUS FOR UNAMBIGUOUS SELECTION OF GRAPHIC OBJECTS, KEYPOINTS AND RELATIONSHIPS

[75] Inventors: Paul Lebovitz, Huntsville; Gary Smith, Madison; Mark Russell, Decator; Eric Mawby, Madison, all of Ala.

[73] Assignee: Intergraph Corporation, Huntsville, Ala.

[21] Appl. No.: 08/974,930

[22] Filed: Nov. 20, 1997

Related U.S. Application Data

[63] Continuation of application No. 08/435,647, May 5, 1995, abandoned.

[51] Int. Cl.[7] .................................................. G06T 17/00
[52] U.S. Cl. ............................................................ 345/433
[58] Field of Search ................................... 345/433–441, 345/326, 346, 348, 349

[56] References Cited

U.S. PATENT DOCUMENTS

| | | | |
|---|---|---|---|
| 5,371,514 | 12/1994 | Lawless et al. | 395/135 X |
| 5,442,736 | 8/1995 | Cummins | 395/121 |
| 5,729,704 | 3/1998 | Stone et al. | 345/346 |

FOREIGN PATENT DOCUMENTS

| | | | |
|---|---|---|---|
| 0 318 154 A3 | 5/1989 | European Pat. Off. | G06F 3/033 |
| 0 480 570 A2 | 4/1992 | European Pat. Off. | G06F 15/72 |
| 0 550 838 A1 | 7/1993 | European Pat. Off. | G06F 3/033 |

OTHER PUBLICATIONS

Foley et al., "Fundamentals of Interactive Computer Graphics," pp. 167, 200–201, 210–211, 214 (Addison–Wesley Publishing Co., Philippines 1982 and 1984).

*Primary Examiner*—Almis R. Jankus
*Attorney, Agent, or Firm*—Townsend and Townsend and Crew LLP

[57] ABSTRACT

A computer system with an improved graphically-oriented user interface that permits the user to more easily select for manipulation one object from a number of objects that overlap or are in close proximity to one another at a common location in a graphic display. In a preferred embodiment, the invention presents the computer user with the opportunity to preview all possible objects that the cursor might be identifying at its current position and the ability to select one of those objects for manipulation. Thus, rather than cycling through the entire list of objects available for selection at a location in the display, the user can immediately narrow the list down to the desired selection only. The present invention prevents selection errors and drastically reduces the number of user inputs required to select an object.

36 Claims, 9 Drawing Sheets

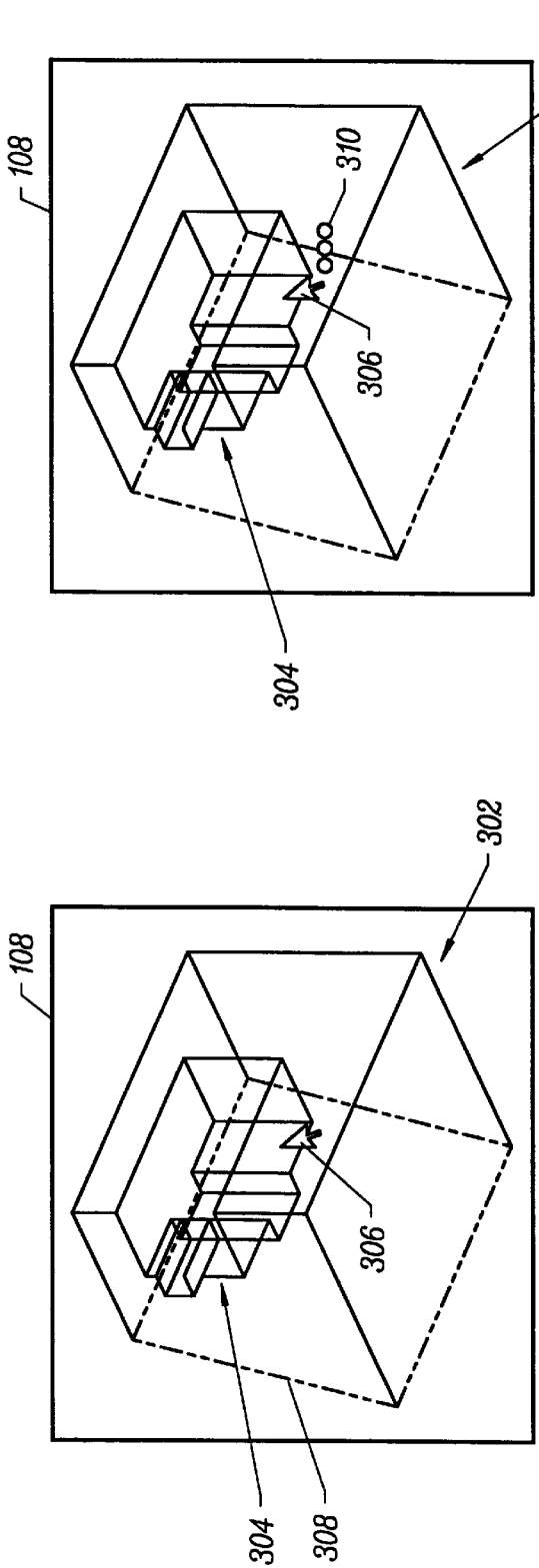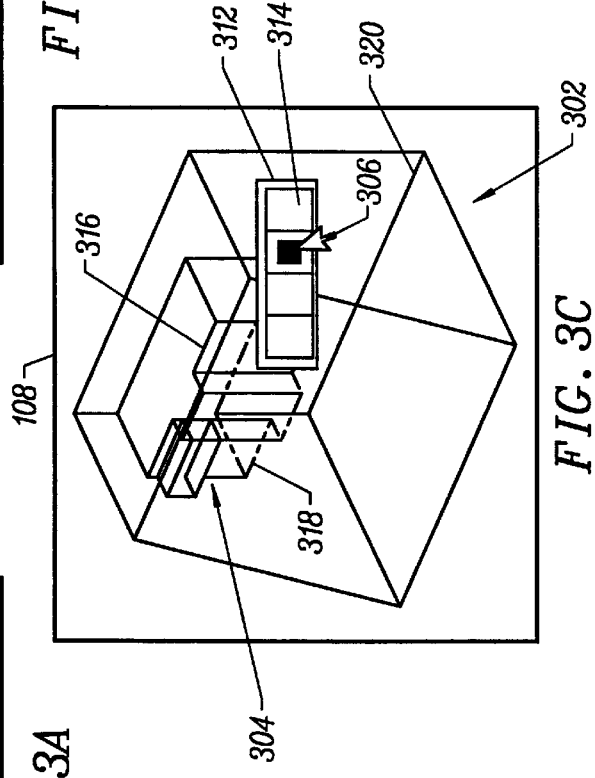

METHOD AND APPARATUS FOR UNAMBIGUOUS SELECTION OF GRAPHIC OBJECTS, KEYPOINTS AND RELATIONSHIPS

This is a Continuation of application No. 08/435,647, filed May 5, 1995, now abandoned.

BACKGROUND OF THE INVENTION

The present invention relates to a computer system having a graphically-oriented user interface. More particularly, the invention relates to a system and method for selecting one of a plurality of overlapping or intersecting graphic images at a location on the graphic display of the computer system.

Computer systems are known in which the user interacts with the system through a graphically-oriented interface. The user can run application programs, manipulate files and perform many other functions by manipulating graphic images on the computer's graphic display. User control may be achieved by cursor control keys on the computer keyboard, a cursor controlling peripheral device, such as a mouse, joystick or track ball, or other control input devices, such as in a pen-based or voice-based system. The graphic images can represent a number of elements in a computer program. For example, programs and data can be shown as "windows" or icons on the display, where each window or icon represents a different application program or data file. Within a particular application program, such as a computer-aided design (CAD) or drawing program, elements are depicted on the graphic display as different figures or icons. For example, in a CAD logic design package, an AND function is identified by the common symbol for an AND gate, and the interconnections among gates are shown as lines or wires. A drawing package can contain representations of common objects such as a line, a two-dimensional box or a three-dimensional cube.

The process of selecting a particular object for manipulation within a graphically-oriented user interface environment can present a problem if several objects are located in the area to which the cursor points. For example, a number of objects might intersect or overlap at a common location in a two-dimensional graphic display, making it unclear which of the objects the cursor is referencing. The user cannot be certain which object is being selected if the user indicates through the cursor-controlling device that an object is to be selected. So, for example, if a mouse is used for cursor control, and the user clicks on a mouse button to select one of the overlapping images, the incorrect object may be selected, since the cursor referenced an image other than the one desired by the user. In a three-dimensional environment, if the cursor is positioned on one surface of a cube, for example, it is not clear if the cursor is pointing to the front surface or the rear surface, which lies underneath the cube's front surface in the graphic display. The problem is further complicated if another object is contained within the cube, since it is then unclear if the cursor is pointing to the cube's front surface or rear surface, or any of the surfaces of the object inside the cube.

Current computer systems address the above problem by allowing the user to reject an object that has been selected by default by the cursor in favor of the one desired by the user. For example, using the simple example of a drawing program including a cube in three-dimensional space on a graphic display, the user may seek to select the rear surface of the cube for the purpose of manipulating that surface only. The user may wish to move the selected surface or change its size, for example. If the cursor is in a position where it could be pointing to either the front or rear surface of the cube, the default selection made by the computer system might be the front surface of the cube. The system would confirm whether this default selection was the one actually desired by the user. The user would then have to reject the selection of the front surface, causing the computer system to present the rear surface as the selected object, which the user would accept. This selection process is already rather tedious if the cursor points to two or three objects at a location. Where a multi-surfaced object is located inside of a cube in three-dimensional space on the graphic display of a computer system, a current selection process would require the user to cycle through four or more possible objects before settling on the desired one. Even worse, if the user accidentally rejected the desired object while cycling through all of the possible objects to be selected, the user would have to repeat the entire cycle to return to the object or surface that was actually meant to be selected.

Thus, a computer system is desired which includes a graphically-oriented user interface that eliminates the tedious and error-prone nature of selecting one of a plurality of objects in a graphic display.

SUMMARY OF THE INVENTION

The present invention provides a computer system with an improved graphically-oriented user interface that permits the user to more easily select for manipulation one object from a number of objects that overlap or are in close proximity to one another at a common location in a graphic display.

In a preferred embodiment, the invention presents the computer user with the opportunity to preview all possible objects that the cursor might be pointing to at its current position and the ability to select one of those objects for manipulation. Thus, rather than cycling through the entire list of objects available for selection at a location in the display, the user can immediately narrow the list down to the desired selection only. The preferred embodiment may be implemented in either a two-dimensional or a three-dimensional graphic display environment to select among several graphic objects, keypoints or relationships. The present invention prevents selection errors and drastically reduces the number of user inputs required to select an object.

A further understanding of the nature and advantages of the inventions herein may be realized by reference to the remaining portions of the specification and the attached drawings.

BRIEF DESCRIPTION OF THE DRAWINGS

FIGS. 3A–3C illustrate the selection of a desired object on a graphic display.

DESCRIPTION OF THE PREFERRED EMBODIMENT

Figure 1A:
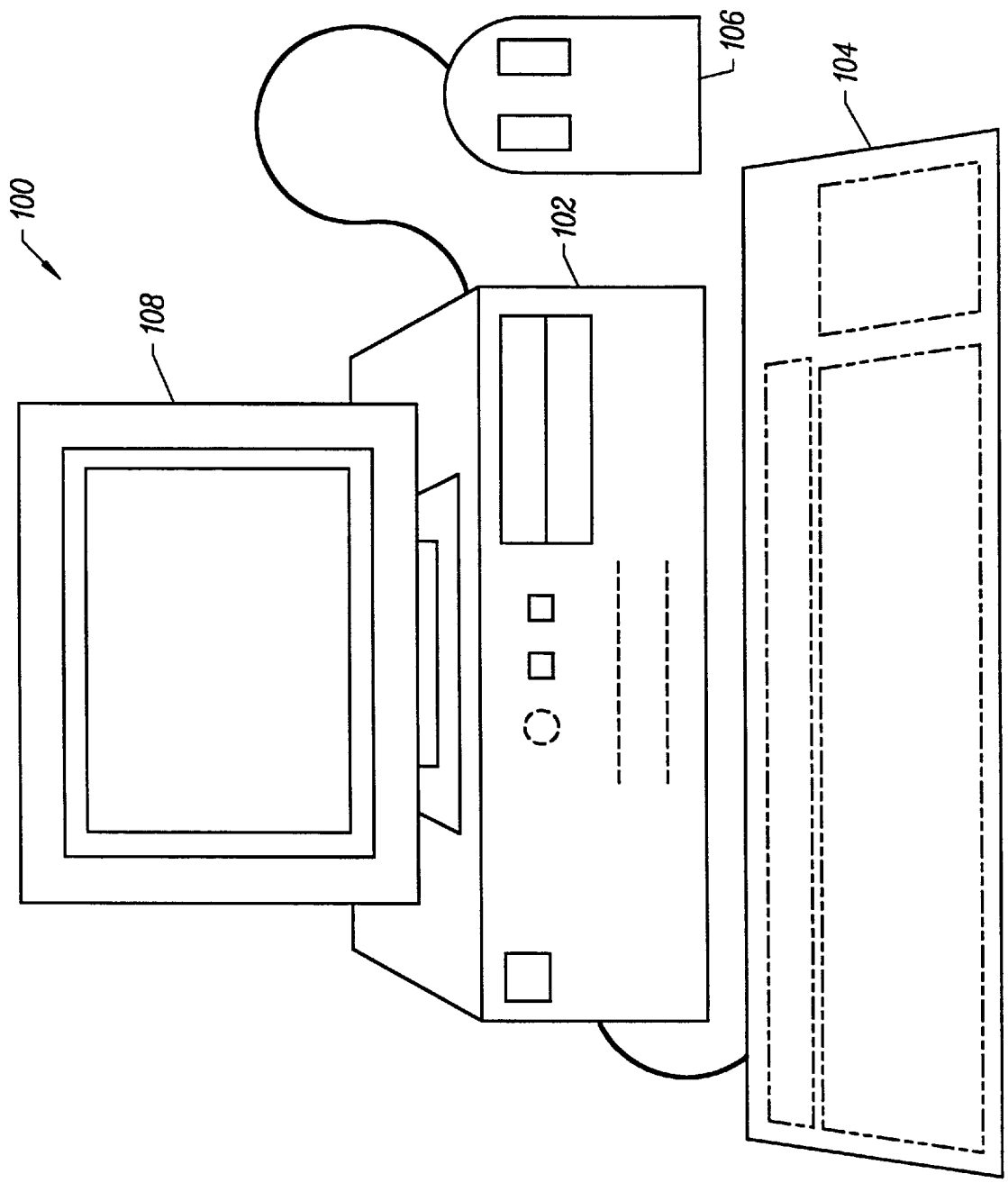
FIG. 1A is a block diagram of an exemplary hardware configuration for a computer system in which the present invention is implemented.

FIG. 1A shows a preferred computer system 100 in which the present invention is implemented. A processing unit 102 contains the control elements of the computer system 100. Keyboard 104 and mouse 106 are coupled to processing unit 102 and enable the system user to input commands and data to computer system 100. Display device 108 serves as the final element of the user interface, where the user can see the results of the inputs to keyboard 104 and mouse 106 and the effect of those inputs in the application program.

Figure 1B:
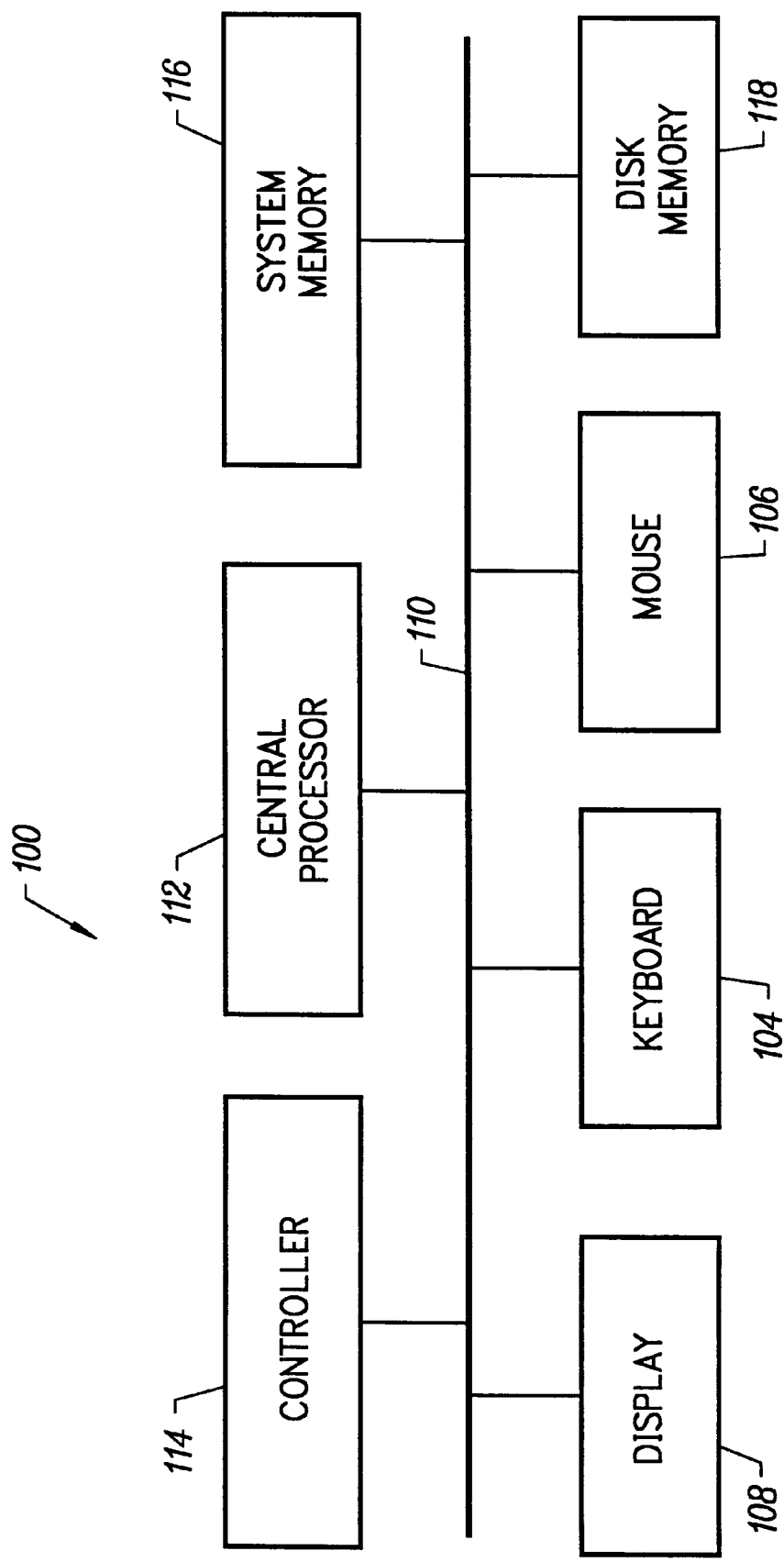
FIG. 1B is a system architecture block diagram of the computer system of FIG. 1A.

FIG. 1B shows a system architecture block diagram of the computer system of FIG. 1A. The system elements are interconnected by system bus 110. In addition to keyboard 104, mouse 106 and display 108, the control elements included in processing unit 102 are shown. Central processor (CPU) 112 and controller 114 control operation of computer system 100. Program and data information are stored in system memory 116 and disk memory 118. The user interface system of the present invention which allows the user to more easily select an object on display device 108 for manipulation is operably disposed in system memory 116 and disk memory 118.

Figure 2A:
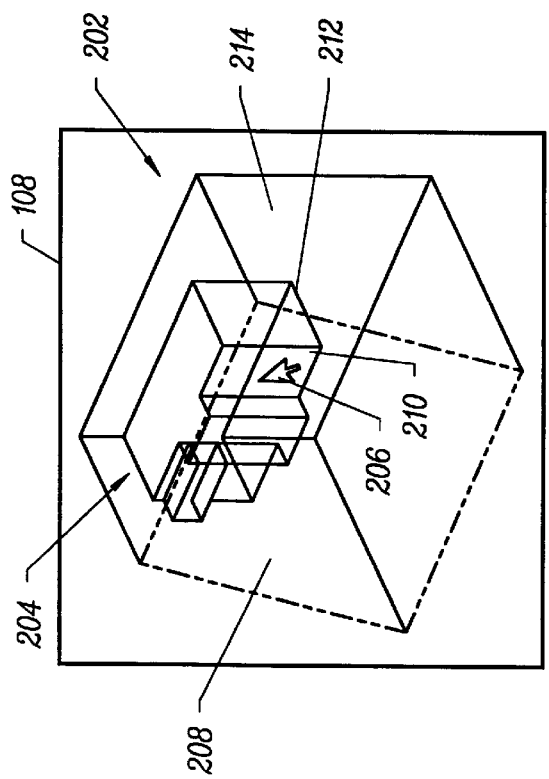
FIGS. 2A–2C show several exemplary views of a three-dimensional object on a graphic display screen which presents problems in selecting a desired face of the object.
Figure 2B:
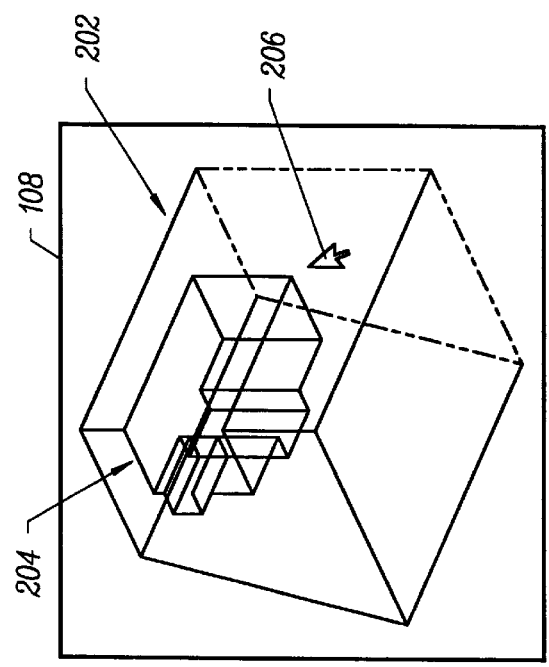
Figure 2C:
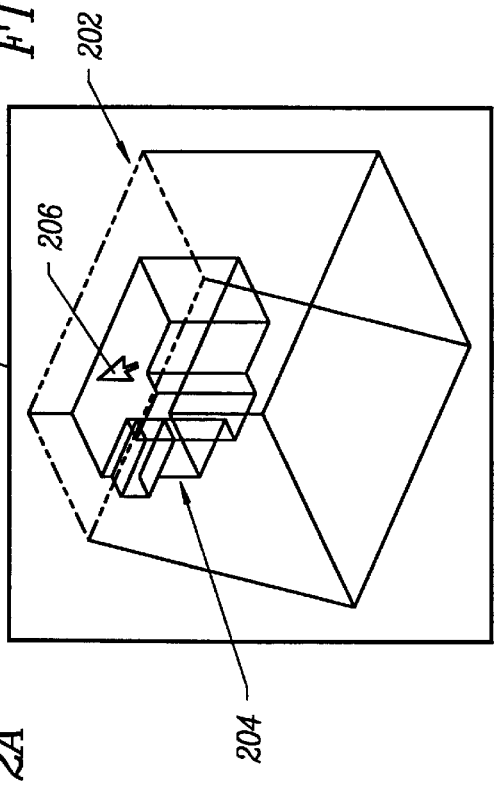

FIGS. 2A–2C show examples of a three-dimensional object 202 on graphic display screen 108 which present problems in selecting a desired object for manipulation. Another three-dimensional object 204 is shown contained within object 202, further complicating the selection process. The cursor 206 has the shape of an arrow on display screen 108, where the location referenced by cursor 206 is directly under the tip of the arrow. As shown in FIG. 2A, one of the objects or surfaces at the location of cursor 206 on display screen 108 is selected for manipulation by the user by default, which the computer system 100 identifies by highlighting that object. In FIG. 2A, the highlighted surface is front surface 208 of object 202. However, the user may have moved cursor 206 to the position shown because of a need to manipulate any one of the other surfaces that lie beneath the cursor. The user may have wanted to select front surface 210 of the inner three-dimensional object 204, bottom surface 212 of object 204 or the rear surface 214 of outer three-dimensional object 202.

However, computer system 100 currently does not present the user with the choice of all possible surfaces. Instead, as described above, the user must cycle through each of the possible surfaces highlighted by computer 100 until arriving at and selecting the desired one. If, for example, the user wishes to select the rear surface 214 of outer three-dimensional object 202 for manipulation, the user may have to reject the first highlighted surface 208, the second highlighted surface 210 and the third highlighted surface 212, before finally selecting the final highlighted surface 214. This process is tedious and error-prone, especially considering the possibility that the user might accidentally miss selecting a desired surface and be forced to cycle through the entire list again. As is evident from FIG. 2B and FIG. 2C, the user would incur the same problems regardless of where cursor 206 is placed. In a three-dimensional environment, where a surface or object is often positioned behind another surface or object in the graphic display of a computer system, the user will almost always have a number of possible selections wherever the cursor is placed on the display screen 108. The present invention speeds up the process of selecting one of a number of possible objects on the graphic display screen.

FIGS. 3A–3C illustrate the selection of a desired object on a graphic display. Similar to FIG. 2A, graphic display screen 108 displays an outer three-dimensional object 302 that also contains an inner three-dimensional object 304. The position of cursor 306 on the display screen 108 is again indicated by the tip of the arrow shape of cursor 306. If the user wishes to isolate and select a particular surface or object for manipulation, the user begins the selection process by moving cursor 306 using the cursor-controlling means provided with the computer system 100, such as mouse 106 (FIG. 1A), to a position above the desired object. Again, one of the objects at the location of cursor 306 on the display screen 108 is selected for user manipulation by default, which the computer system 100 identifies by highlighting that object. In FIG. 3A, the highlighted surface is front surface 308 of object 302. If the user wishes to select highlighted surface 308 for manipulation anyway, that selection can be communicated to the computer system 100 immediately. If the cursor-controlling means is mouse 106, for example, the user may click on the appropriate mouse button to select and isolate front surface 308 for manipulation. However, if the user does not wish to select the default surface, the tedious rejection process may be avoided.

If an object other than the default object is desired, the user stops cursor motion and pauses cursor 306 at the desired position, as shown in FIG. 3B. The system recognizes that a pause in cursor motion indicates the need to make a selection of an object other than the default selection might exist. If it happens that the pause in cursor motion does not indicate the need to make a selection of another object and that there is only one object that could be selected by the user at the current location of cursor 306, an input by the user to the system would automatically select that object. So, for example, if the user moved the mouse 106 to position cursor 306 at a location where only one object could be selected, that object would be highlighted by the system. Then if the user paused the mouse at that position, when the user clicked on the mouse button, the highlighted object would be selected for further manipulation by the user.

However, if more than one object could be selected at the current cursor location, a list symbol 310 appears on display screen 108 indicating that the user has the option of selecting one of the possible objects for manipulation. In FIG. 3B, list symbol 310 is shown as an ellipsis. However, it is clear that list symbol 310 could be any one of a number of symbols or characters, such as a small box or the letter "L" for example, that would indicate to the user that the next step is selecting one of the possible objects pointed to by cursor 306. When the user clicks the appropriate mouse button in response to the appearance of list symbol 310, the user is provided with a selection box showing all of the possible selections. FIG. 3C shows an example of a selection box 312 as it might appear on display screen 108. An individual cell 314 in selection box 312 corresponds to one of the objects located under the current position of cursor 306. The number of cells 314 in selection box 312 remains flexible so that there are at least as many cells as objects that could be selected from the cursor location. So, for example, if cursor 306 is located at the same position as shown in FIG. 3B, the selections include front surface 308 of the outer three-dimensional object 302, front surface 316 of inner three-dimensional object 304, bottom surface 318 of inner three-dimensional object 304 or rear surface 320 of outer three-dimensional object 302. In this case, selection box 312 would contain at least four cells 314.

In order to select one of these objects, the user would move mouse 106 to position cursor 306 within selection box 312. As cursor 306 is positioned over each individual cell 314, the object on display screen 108 that corresponds to a particular cell 314 will be highlighted to show the association between cell and object to the user. As shown in FIG. 3C, cursor 306 is positioned over the upper left cell in selection box 312, and the corresponding object, bottom surface 318 of inner three-dimensional object 304, is highlighted. In an alternative embodiment, if appropriate, an icon representing the object on display screen 108 that corresponds to a particular cell 314 might be displayed within the cell to show the association between cell and object to the user. The user may move the cursor 306 from cell to cell within selection box 312 to observe the correspondence between each cell 314 and each possible object that might be selected. In order to select one of the objects identified by selection box 312, the user would position cursor 306 over the corresponding cell 314 and input the selection to the computer system. In a preferred embodiment, where the cursor-controlling device is mouse 106, the user would click on the appropriate mouse button to select the highlighted object.

If the user were to decide not to select one of the objects at the current cursor location after all and wanted to continue from the point where the selection process began, the user would only need to move cursor 306 outside of a tolerance zone surrounding selection box 312 or select a cell 314 reserved for that purpose. When computer system 100 recognizes the position of cursor 306 outside of the selection box limits, the entire process is restarted, and the user can move cursor 306 to a new position on display screen 108 to select another object.

By using selection box 312 to select a desired object on display screen 108 of a computer system, computer system 100 eliminates the tedious process of cycling through and rejecting all of the possible objects presented for selection by default by the system. By giving the user more control at the outset of the selection process, allowing the user to preview and select a highlighted object, rather than forcing the user merely to respond to system prompts throughout the process, the time spent in selection of an object and the number of required user inputs to the computer system are minimized.

The above example involving objects in three-dimensional space on a graphic display also pertains to a different system environment, such as, for example, a three-dimensional virtual reality environment. Rather than using a mouse as a cursor-controlling device, the user might employ a glove or finger-pointing device to select overlapping or hidden objects that the user "sees" in the virtual three-dimensional space. The user would be given a listing all of the objects within the selection range of the cursor. Then, as in the above example, the user would input the selection of one of those overlapping objects to the computer system which would isolate the selected object for further manipulation by the user.

The intelligent object selection described above is equally applicable to a graphic display in a two-dimensional environment. Although a two-dimensional environment does not present as many problems of "hidden" objects as in a three-dimensional environment, the user may still have a number of possible object selections at a given cursor location due to overlapping objects or objects that are in close proximity to one another. In this case, computer system 100 again eliminates the tedious process of cycling through and rejecting possible selections before selecting the desired object by providing the user with a selection box that enables isolation of the particular object desired by the user at the outset of the selection process.

Figure 4B:
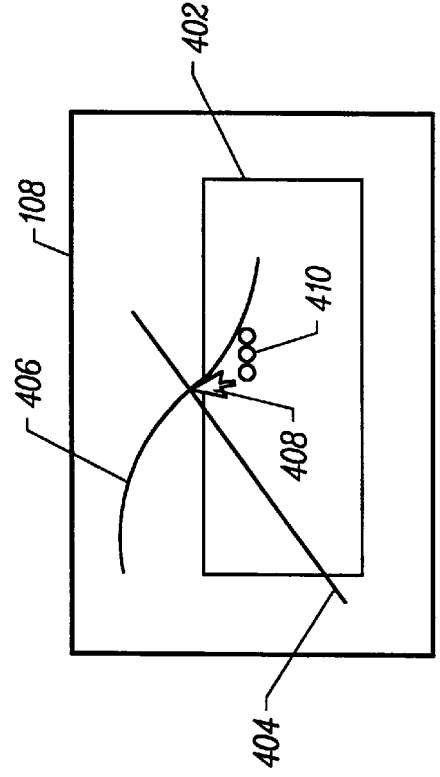
FIGS. 4A–4C show examples of selection of a desired object on a graphic display in a two-dimensional environment.
Figure 4A:
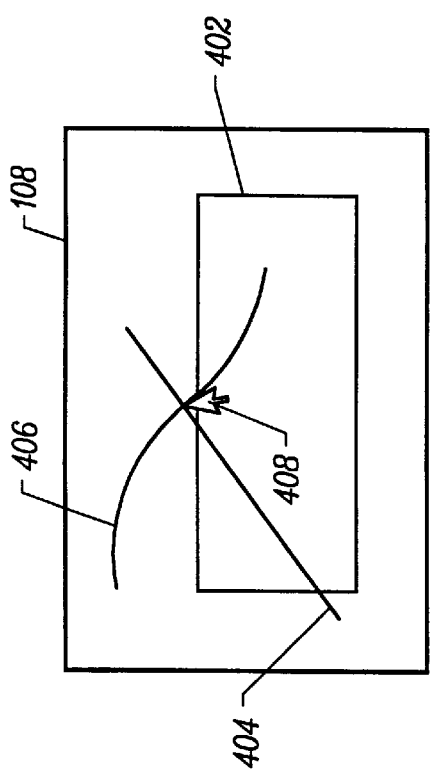
Figure 4C:
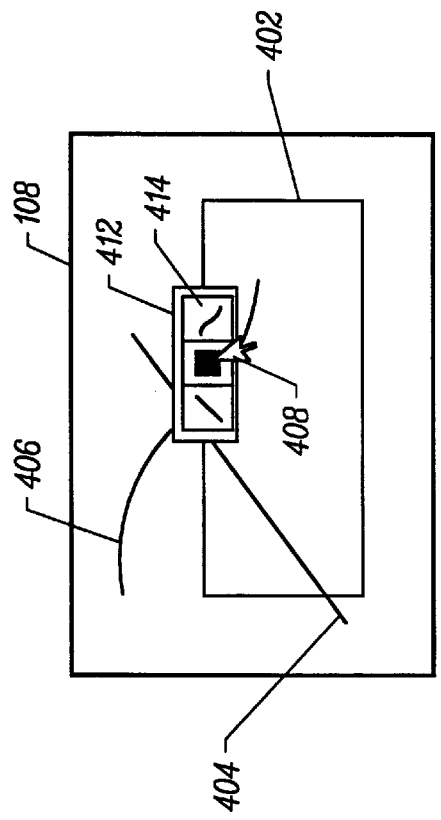

FIGS. 4A–4C show examples of selection of a desired object on a graphic display in a two-dimensional environment. Graphic display screen 108 displays a box 402 whose edges are intersected at various points by straight line 404 and curved line 406. The position of the cursor is again indicated by a cursor 408 having an arrow shape. Similar to the process described in conjunction with FIGS. 3A–3C, if the user wishes to isolate and select a particular surface or object for manipulation, the user begins the selection process by moving cursor 408 using the cursor-controlling means provided with the computer system 100, such as mouse 106 (FIG. 1A), and pausing above the desired object. Computer system 100 recognizes that a pause in cursor motion potentially indicates the need to make a selection of one of a number of objects. Again, if it happens that a pause in cursor motion does not indicate the need to make a selection of another object and that there is only one object that could be selected by the user at the current location of cursor 408, an input by the user to the system would automatically select that object. So, for example, if the user moved the mouse 106 to position cursor 408 at a location where only one object could be selected, that object would be highlighted by the system. Then if the user paused mouse 106 at that position, when the user clicked on the appropriate mouse button, the highlighted object would be selected for further manipulation by the user.

If more than one object could be selected at the cursor location, a list symbol 410 appears on display screen 108 indicating that the user has the option of selecting one of the possible objects for manipulation. In FIG. 4B, the list symbol 410 is again shown as an ellipsis. However, it should again be clear that list symbol 410 could be any one of a number of symbols or characters that would indicate to the user that the next step is selecting one of the possible objects pointed to by the cursor 408. When the user clicks the appropriate mouse button in response to the appearance of list symbol 410, the user is provided with a selection box showing all of the possible selections. FIG. 4C shows an example of a selection box 412 as it might appear on display screen 108. An individual cell 414 in selection box 412 corresponds to one of the objects located under the current position of cursor 408. The number of cells 414 in selection box 412 may remain flexible so that there are exactly as many cells as objects that could be selected from the cursor location. So, for example, if cursor 408 is located at the same position as shown in FIG. 4B, the selections include box 402, straight line 404 or curved line 406. In this case, selection box 412 would contain at least four cells 414.

In order to select one of these objects, the user would move the mouse to position cursor 408 within selection box 412. In a preferred embodiment, an icon representing the object on display screen 108 that corresponds to a particular cell 414 will be displayed within the cell to show the cell-object association to the user. Therefore, as shown in FIG. 4C, the left cell contains a straight line corresponding to line 404, the center cell contains a box corresponding to box 402, and the right cell contains a curve corresponding to curve 406. In an alternative embodiment, as cursor 408 is positioned over each individual cell 414, the object on display screen 108 that corresponds to a particular cell 414 could be highlighted to show the association between cell and object to the user, as described above in conjunction with FIG. 3C. In order to select one of the objects identified by selection box 412, the user would position cursor 408 over the corresponding cell 414 and input the selection to the computer system. In a preferred embodiment, where the cursor-controlling device is mouse 106, the user would click on the appropriate mouse button to select the desired object. As shown in FIG. 4C, the user may click on the center cell of selection box 412 to select box 402 for further manipulation.

Again, if the user were to decide not to select one of the objects at the current cursor location after all and wanted to continue with the application from the point where the selection process began, the user would only need to move cursor 408 outside of a tolerance zone surrounding selection box 412 or select a cell 414 reserved for that purpose. When computer system 100 recognizes the position of cursor 408 outside of the selection box limits, the entire process is restarted, and the user can move cursor 408 to a new position on the graphic display to select another object.

As in the case of a three-dimensional environment, by using selection box 412 to select a desired object on the two-dimensional graphic display of a computer system, computer system 100 eliminates the tedious process of cycling through and rejecting all of the possible objects presented for selection by default by the system. By giving the user more control at the outset of the selection process, allowing the user to preview and select an object, rather than forcing the user merely to respond to system prompts throughout the process, the time spent in selection of an object and the number of required user inputs to the computer system are minimized.

Figure 5:
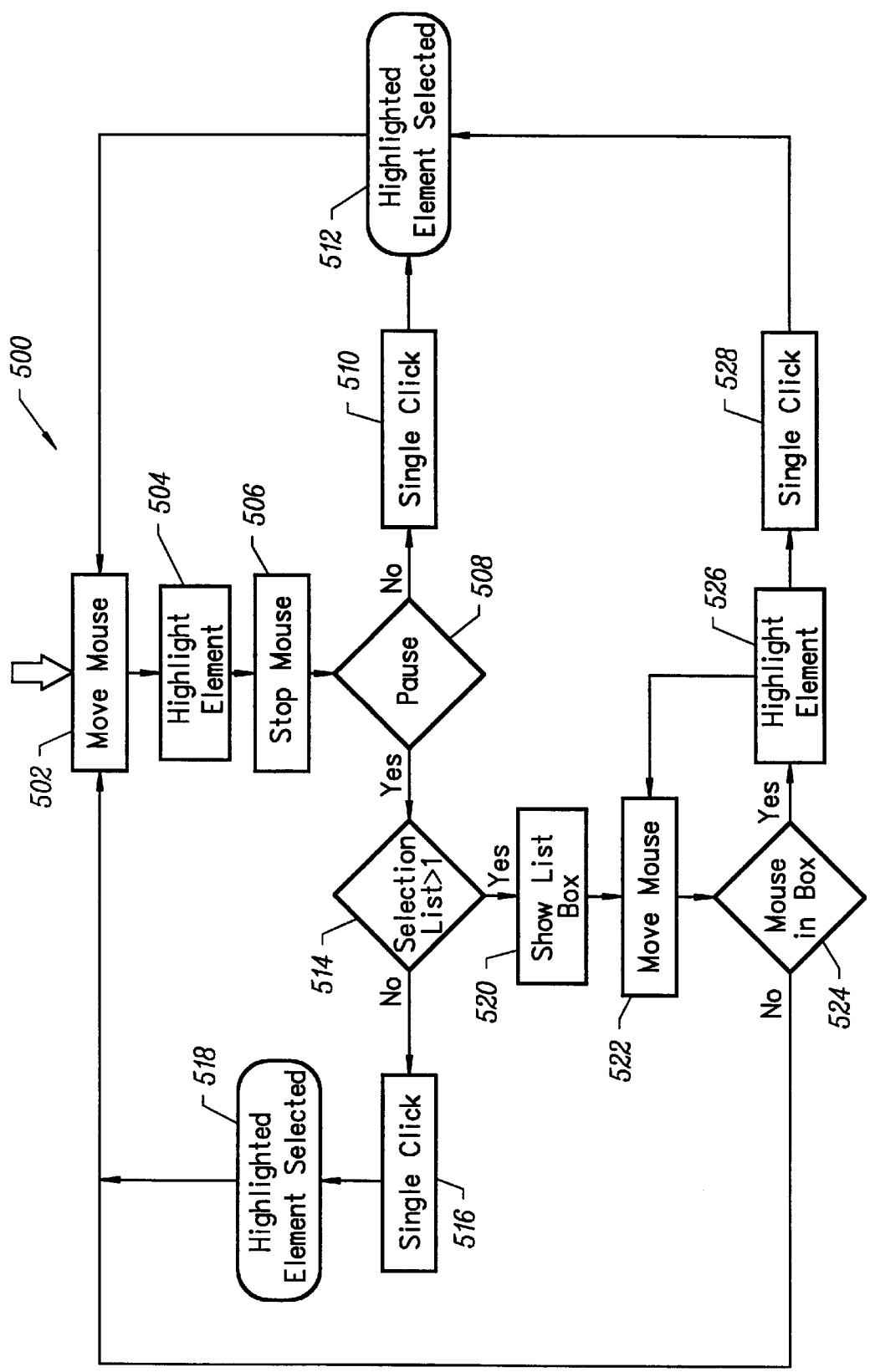
FIG. 5 shows a flow diagram of a process of a user attempting to select an object on a graphic display.

FIG. 5 shows a flow diagram of a process of a user attempting to select an object on a graphic display. Flow diagram 500 describes the selection process in an embodiment where the cursor-controlling means is mouse 106 (FIG. 1A) and a selected element is highlighted. It should be understood that the general process described in flow diagram 500 is applicable to alternative embodiments, such as, for example, an embodiment where an iconic representation of a selected element is placed in its corresponding cell in the selection box, as described in conjunction with FIG. 4C.

At step 502, the user moves the mouse to position the cursor at various locations across the graphic display screen. As the cursor passes over different objects or elements on the screen, the element pointed to by the cursor for default selection is highlighted at step 504. If the user wishes to select a particular object or element for further manipulation, the mouse is stopped at the appropriate position in step 506. The computer system then determines at step 508 whether the user has paused the mouse at its current location without providing any further input. If the element highlighted by the computer system is actually the one the user wishes to select, there is no need to pause the mouse to cause the selection box to appear, and the user clicks on the appropriate mouse button in step 510, causing the highlighted element to be selected in step 512. If the computer system does detect a pause in mouse activity, the subroutine proceeds to step 514, where the determination is made as to whether the cursor is pointing to more than one object at its current position.

If only one object could possibly be selected at the current cursor position, the user clicks on the appropriate mouse button in step 516, and the highlighted element is selected in step 518 for further user manipulation. If, however, a plurality of elements may be selected at the current cursor position, a list symbol appears on the display screen and a selection box is displayed in step 520. The user then moves the mouse at step 522 to position the cursor within the confines of the selection box to select one of the elements at the current cursor position. At step 524, the system determines whether the cursor is indeed located within the selection box. If it is not, then the subroutine returns to step 502, since the user has indicated a willingness to move to another location on the graphic display and select from another group of elements by removing the cursor from the selection box. But if the cursor is still within the box, the element corresponding to the cell pointed to by the cursor is highlighted in step 526. If the user does not wish to select that particular element, the mouse is moved to another cell in the selection box in step 522. The corresponding element is again highlighted in step 526. Once the user finds the desired element, the appropriate mouse button is clicked in step 528, and the corresponding element or object is selected in step 512 for further user manipulation.

In another embodiment of the present invention, the user is given the opportunity to select among several keypoints that are located in close proximity to one another at the cursor location. Keypoints are points of interest on an object, such as the center point of a circle or the endpoint of a line, and interesting points between objects, such as the intersection of two lines. When creating a new object, such as a line, it is often required to place it with respect to keypoints of existing objects. It should be noted that keypoints are not limited to two-dimensional objects. A keypoint could be the center point of a sphere or the corner of a box in three-dimensional space. The concept of keypoints can be further extended to include keylines and other objects. For example, a keyline could result from the intersection of two planer surfaces.

As with object selection, the selection of keypoints within graphics environments is tedious and error prone when several keypoints are located in the area to which the cursor points. In fact, it is often the case that keypoints exactly overlap, that is to say they are coincident. Which keypoint the user selects is of critical importance because relationships are based upon key-points and the elements to which they belong. Relationships are persistent behavioral rules which interrelate objects. The examples shown in FIGS. 6–8 serve to illustrate the concept of keypoints and relationships.

Figure 6C:
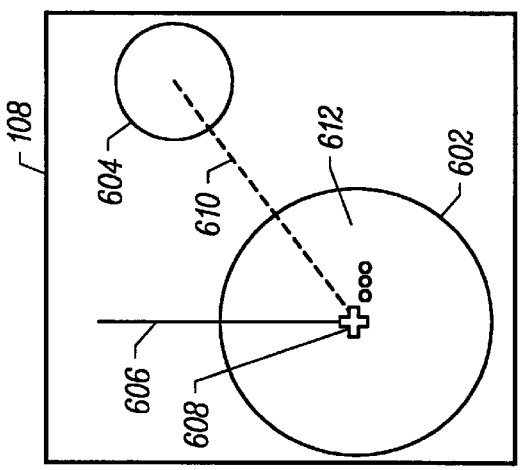
FIGS. 6A–6E illustrate the selection of a desired keypoint on a graphic display.
Figure 6B:
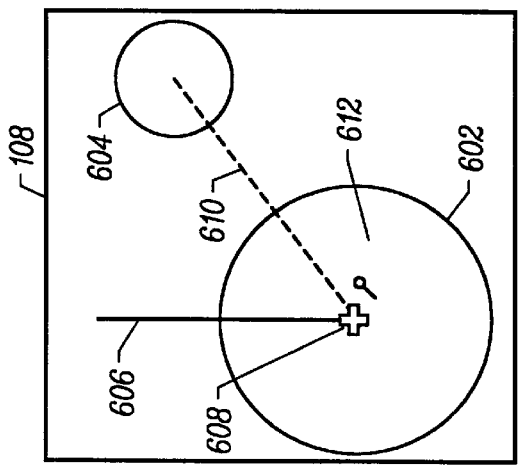
Figure 6E:
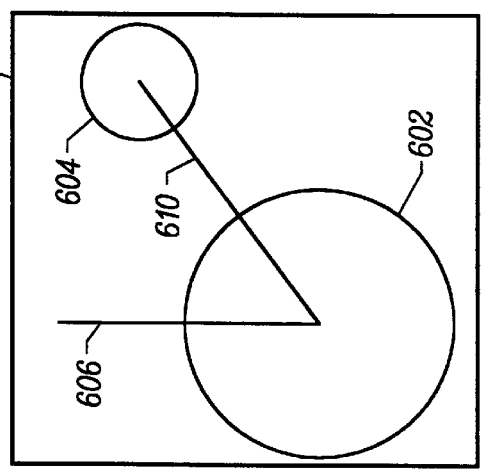
Figure 6A:
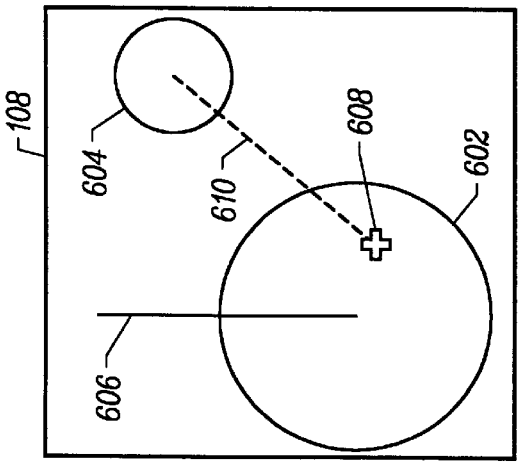
Figure 6D:
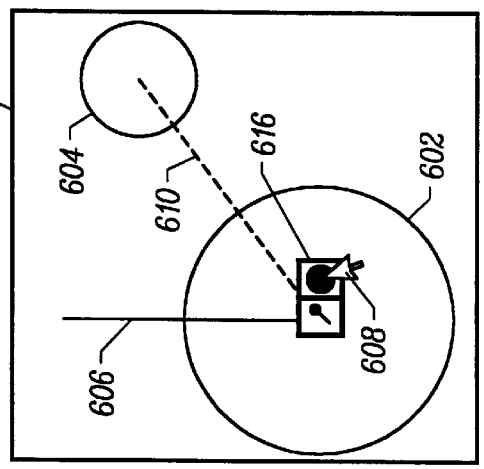

In FIG. 6A, graphic display screen 108 displays a circles 602 and 604, as well as a line 606 whose endpoint is coincident with the centerpoint of circle 602. The position of the cursor is indicated by a cursor 608 having a shape of a plus symbol. In FIG. 6A, the user is attempting to create a new line 610 between the centerpoint of circle 602 and the centerpoint of circle 604. In FIG. 6B, as the cursor 608 is moved to the centerpoint of circle 604, line 606 is highlighted. At the bottom right hand corner of cursor 608, an iconic representation 612 of the default keypoint is displayed, which is the endpoint of line 606 in this example. Assume that the user actually wishes to select the centerpoint of circle 602 as the keypoint that defines new line 610. When the user pauses cursor 608 an ellipsis 614 is displayed next to cursor 608, as shown in FIG. 5C, indicating that other keypoints have been found. A click on the appropriate button of mouse 106 signals computer system 100 to display a selection list shown as a selection box 616 in FIG. 5D. Selection box 616 shows all possible keypoint/relationship combinations using appropriate graphical representations. As noted above, in an alternative embodiment, the cell in selection box 616 that identifies a keypoint/relationship combination could be highlighted. The user directly selects the desired keypoint/relationship combination by positioning cursor 608 over its graphical representation in selection box 616 and pressing the appropriate button of mouse 106.

Figure 7B:
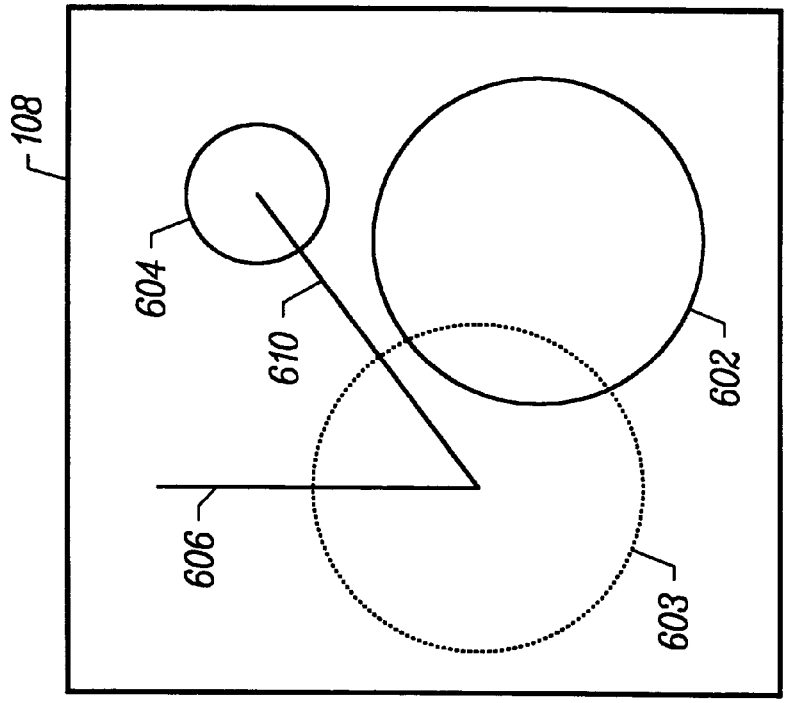
FIGS. 7A–7B illustrate the effect of the selection of a desired keypoint on a resulting relationship.
Figure 7A:
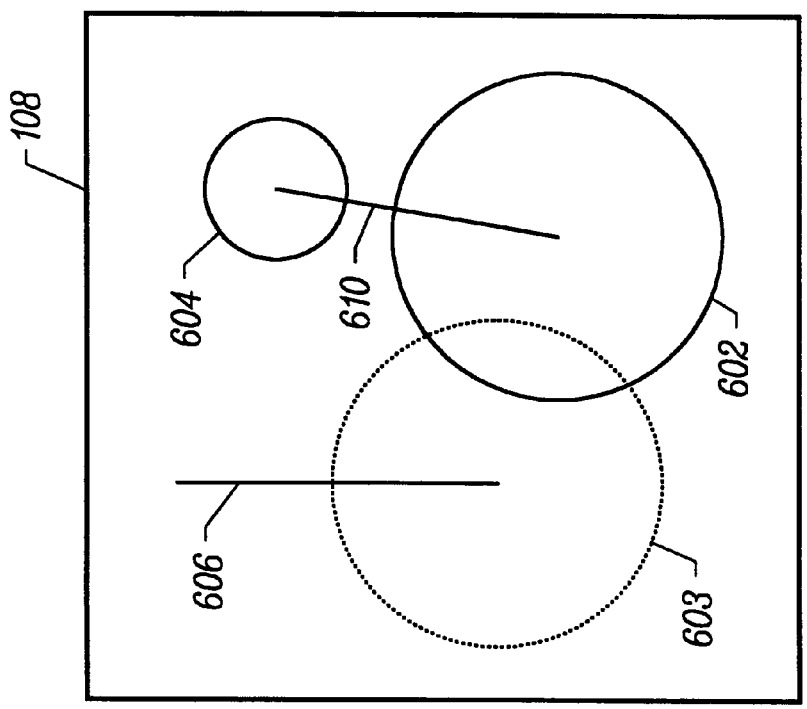
Figure 8C:
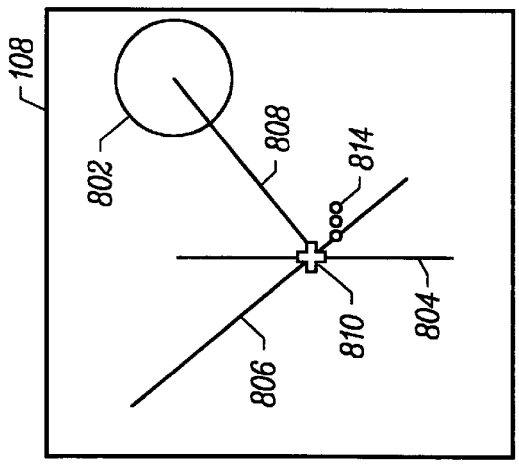
FIGS. 8A–8E illustrate the selection of a desired keypoint on a graphic display.
Figure 8B:
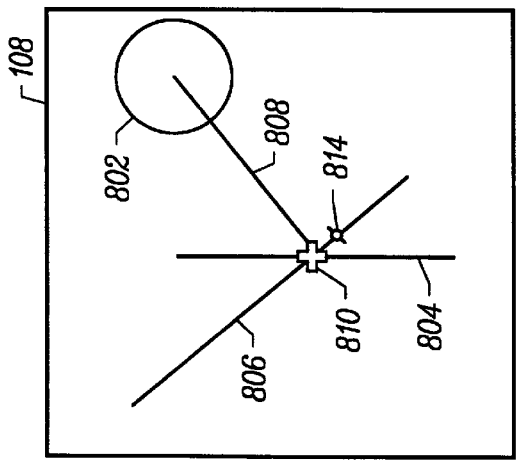
Figure 8E:
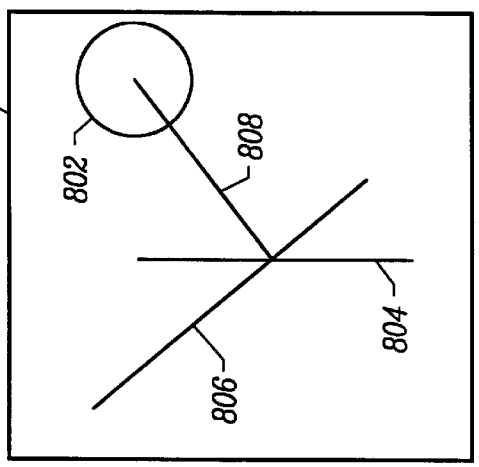
Figure 8A:
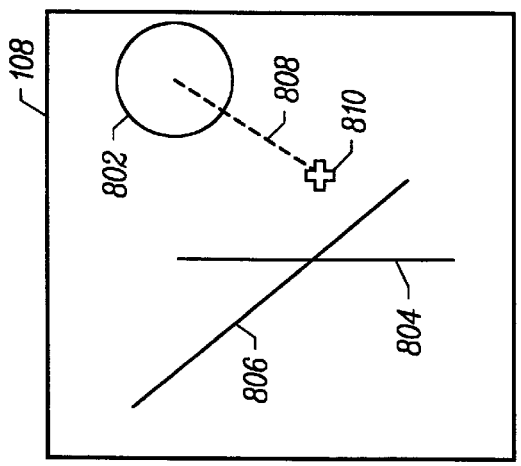
Figure 8D:
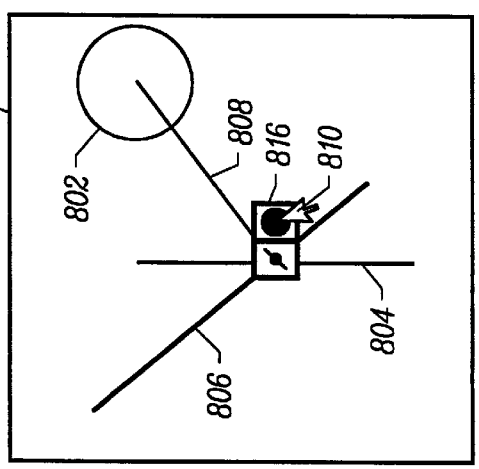

In the example shown in FIG. 6, the user could have reference the end of new line 610 to either the centerpoint of circle 602 or the endpoint of line 606. In both of these cases, the user would be selecting both a keypoint and a relationship. The relationship is that the endpoint of line 606 is coincident with the keypoint. FIG. 7 demonstrates the difference between the two selections. In FIG. 7A, the user moves circle 602 to a new location after new line 610 has been placed with reference to the centerpoint of circle 602. The old location of the circle is shown by broken line circle 603. New line 610 maintains its relationship with the centerpoint of circle 602, moving along with circle 602. However, as shown in FIG. 7B, if the user had chosen to place the endpoint of line 4 with reference to the endpoint of line 606, moving circle 602 would have no effect on new line 610, which would remain connected to line 604 that was coincident with the prior position of the centerpoint of broken line circle 603.

Another example is shown in FIG. 8, in which graphic display screen 108 displays a circle 802 in addition to lines 804 and 806. The midpoint of line 804 is close proximity to the intersection of line 804 and line 806. However, the two keypoints (mid-point of line 804 and intersection of lines 804 and 806) are only in close proximity and are not coincident with each other. Assume that in FIG. 8A, the user wishes to place a new line 808 from the center of circle 802 to the intersection of line 804 and line 806. The position of the cursor is indicated in the display by cursor symbol 810. In FIG. 8B, as the cursor 810 is moved to the desired keypoint, line 804 is highlighted. At the bottom right hand corner of cursor 810, an iconic representation 812 of the default keypoint is displayed, which is the midpoint of line 804 in this example. Assume that the user actually wishes to select the intersection of lines 804 and 806 as the keypoint that defines new line 808. When the user pauses cursor 810 an ellipsis 814 is displayed next to cursor 810, as shown in FIG. 8C, indicating that other keypoints have been found. A click on the appropriate button of mouse 106 signals computer system 100 to display a selection list shown as a selection box 816 in FIG. 8D. Selection box 816 shows all possible keypoint/relationship combinations using appropriate graphical representations. As noted above, in an alternative embodiment, the cell in selection box 816 that identifies a keypoint/relationship combination could be highlighted. The user directly selects the desired keypoint/relationship combination by positioning cursor 810 over its graphical representation in selection box 816 and pressing the appropriate button of mouse 106. FIG. 8E shows new line 808 connecting the centerpoint of circle 802 and intersection of lines 804 and 806.

The above description is illustrative and not restrictive. Many variations of the invention will become apparent to those of skill in the art upon review of this disclosure. For example, if a user were using an application offering the feature of text manipulation, it might be unclear if the cursor is pointing to a letter, a word or an entire sentence. In this case, the computer system of the present invention could present a selection box on the display screen from which the user would select the desired text.

The scope of the invention should, therefore, be determined not with reference to the above description, but instead should be determined with reference to the appended claims along with their full scope of equivalents.

What is claimed is:

1. In a computer system having a visual display for display of graphic images comprising a plurality of objects selectable by a cursor, a method of resolving ambiguities in object selection comprising:

identifying a position for each object of the plurality of objects;

identifying a position of the cursor;

identifying which objects of the plurality of objects are within a selection range, thereby being in-range objects, wherein the in-range objects comprise hidden objects and visible objects;

displaying a list of the in-range objects; and selecting one of the in-range objects from the list of the in-range objects.

2. The method of resolving ambiguities of claim 1 wherein identifying a position of the cursor further comprises moving a mouse.

3. The method of resolving ambiguities of claim 1 wherein identifying the in-range objects further comprises identifying objects on the visual display directly underneath the position of the cursor.

4. The method of resolving ambiguities of claim 1 wherein viewing the list of the in-range objects further comprises viewing an iconic representation of each of the in-range objects.

5. The method of claim 4 wherein selecting one of the in-range objects further comprises selecting an iconic representation of the one object.

6. The method of resolving ambiguities of claim 1 wherein displaying the list of in-range objects further comprises displaying a selection box.

7. The method of resolving ambiguities of claim 6 wherein displaying the selection box further comprises displaying a plurality of cells, each cell corresponding to one of the in-range objects.

8. The method of resolving ambiguities of claim 7 wherein selecting one of the in-range objects further comprises selecting one of the plurality of cells corresponding to said one of the in-range objects.

9. The method of resolving ambiguities of claim 8 wherein selecting one of the in-range objects further comprises:

positioning the cursor on said one of the plurality of cells corresponding to said one of the in-range objects; and receiving a selection of said one of the plurality of cells corresponding to said one of the in-range objects in the computer system.

10. In a computer system having a visual display for display of graphic images comprising a plurality of objects selectable by a cursor, a graphic image display control system for resolving ambiguities in object selection comprising:

means for identifying a position for each object of the plurality of objects;

means for identifying a position of the cursor;

means for identifying which objects of the plurality of objects are within a selection range, thereby being in-range objects, wherein the in-range objects comprise hidden objects and visible objects;

means for displaying a list of the in-range objects; and means for selecting one of the in-range objects.

11. The graphic image display control system of claim 10 wherein the means for identifying a position of the cursor further comprises a user input device.

12. The graphic image display control system of claim 10 wherein the in-range objects further comprise objects on the visual display directly underneath the position of the cursor.

13. The graphic image display control system of claim 10 wherein the list of the in-range objects further comprises an iconic representation of each of the in-range objects.

14. The graphic image display control system of claim 13 wherein said means for selecting further comprises means for selecting an iconic representation of the one object.

15. The graphic image display control system of claim 10 wherein the list of the in-range objects further comprises a selection box.

16. The graphic image display control system of claim 15 wherein the selection box further comprises a plurality of cells, each cell corresponding to one of the in-range objects.

17. The graphic image display control system of claim 16 wherein the means for selecting one of the in-range objects further comprises a means for selecting one of the plurality of cells corresponding to said one of the in-range objects.

18. The graphic image display control system of claim 17 wherein the means for selecting one of the in-range objects further comprises:
means for positioning the cursor on said one of the plurality of cells corresponding to said one of the in-range objects; and
means for receiving the selection of said one of the plurality of cells corresponding to said one of the in-range objects to the computer system.

19. In a computer system having a visual display for display of graphic images comprising a plurality of objects selectable by a cursor, a method of resolving ambiguities in object selection comprising:
selecting a position on the visual display;
determining a set of in-range objects from the plurality of objects that have at least a portion within a selection range from the position on the visual display;
displaying a list of icons on the visual display; each icon on the list associated with a unique in-range object;
moving the cursor to one icon from the list of icons on the visual display;
highlighting an object from the set of in-range objects associated with the one icon;
selecting the one icon; and
selecting the object on the visual display associated with the one icon.

20. The method of claim 19 further comprising:
moving the cursor to another icon from the list of icons on the visual display; and highlighting another object from the set of in-range objects associated with the another icon.

21. The method of claim 19 wherein the one icon from the list of icons on the display comprises a reduced representations of the object.

22. The method of claim 19 wherein the object is layered underneath other objects from the set of in-range objects.

23. The method of claim 19 wherein the set of in-range objects represent three-dimensional objects.

24. In a computer system having a visual display configured to display of graphic images comprising a plurality of objects, a method for resolving ambiguities in object selection with a cursor comprising the steps of:
receiving a position of the cursor on the visual display;
determining a set of in-range objects from the plurality of objects that have at least a portion that are within a pre-determined distance from the position of the cursor on the display;
displaying a selection box comprising cells on the visual display each cell in the selection box associated with a unique object from the set of in-range objects;
receiving a selection of one cell from the selection box; and
selecting an object from the set of in-range objects associated with the one cell.

25. The method of claim 24 wherein the selection box comprises at least a row of cells.

26. The method of claim 25 further comprising:
receiving another position of the cursor on the visual display, the another position on top of at least part of the one cell; and
highlighting the object associated with the one cell on the visual display.

27. The method of claim 25 wherein the one cell comprises a reduced representation of the object.

28. A computer system for resolving ambiguities in object selection comprising:
a visual display configured to display a plurality of objects, configured to display a list of icons, each icon on the list of icons associated with a unique object from a set of objects, configured to display a highlighted representation of an object from the set of objects associated with an icon from the list of icons; and
a processor coupled to the visual display configured to receive a first position and a second position of a cursor on the visual display, configured to identify the set of objects from the plurality of objects that have at least a portion within a pre-determined distance from the first position, configured to identify the icon from the list of icons associated with the second position, configured to receive a selection of the icon from the list of icons, and configured to select the object from the set of objects associated with the icon, in response to the selection.

29. The computer system claim 28 wherein the processor is also configured to receive a third position of the cursor on the visual display, configured to identify another icon from the list of icons associated with the third position; and
wherein the visual display is also configured to display a highlighted representation of another object from the set of objects associated with the another icon.

30. The computer system of claim 28 wherein the icon from the list of icons displayed on the visual display comprises a visual representations of the object associated with the icon.

31. The computer system of claim 28 wherein the object is arranged below other objects from the set of objects.

32. The computer system of claim 28 wherein the set of in-range objects represent objects in three-dimensional objects space.

33. A computer program product for a computer system having a processor and a visual display for display of graphic images comprising a plurality of objects selectable by a cursor for resolving ambiguities in object selection comprising:
code that instructs the processor to identify a position for each object of the plurality of objects;
code that directs the processor to identify a position of the cursor on the visual display;
code that directs the processor to identify a set of in-range objects from the plurality of objects that have at least a portion that are within a predetermined distance from the position of the cursor on the display;
code that directs the processor to display a selection box comprising cells on the visual display each cell in the selection box associated with a unique object from the set of in-range objects; and code that directs the processor to receive a selection of one cell from the selection box; and code that directs the processor to select an object from the set of in-range objects associated with the one cell on the display;

wherein the codes reside on a computer-readable media.

34. The computer program product of claim 33 wherein the selection box further comprises at least a row of cells.

35. The computer program product of claim 34 further comprising:

code that directs the processor to receive another position of the cursor on the visual display, the another position on top of at least a portion of the one cell; and code that directs the processor to highlight the object associated with the one cell on the visual display.

36. The computer program product of claim 34 wherein the one cell comprises a representation of the object.

* * * * *